March 26, 1935. C. A. DELEMME 1,995,966
APPARATUS FOR THE CONDITIONING OF SUBSTANCES
Filed May 25, 1932
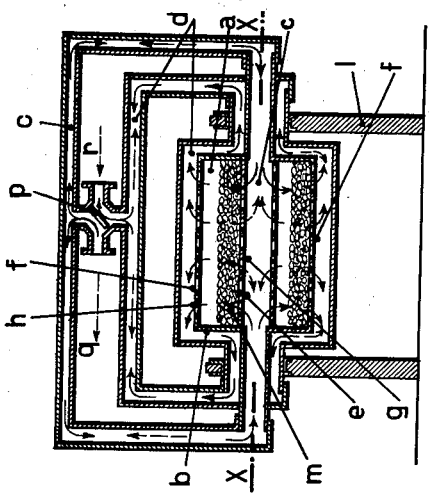
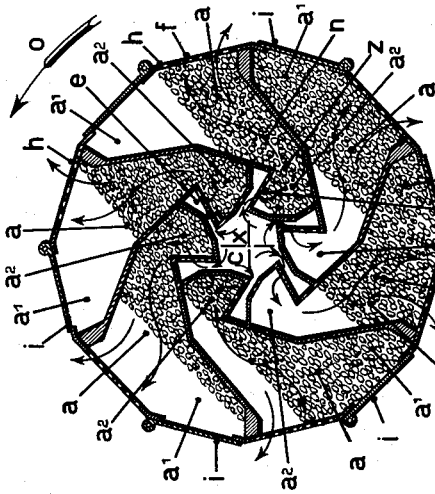
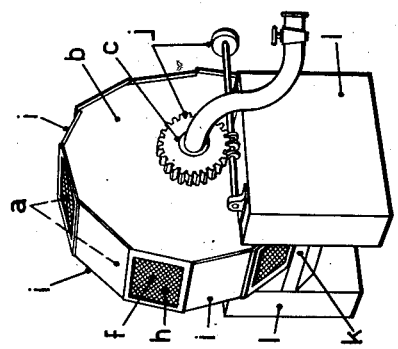
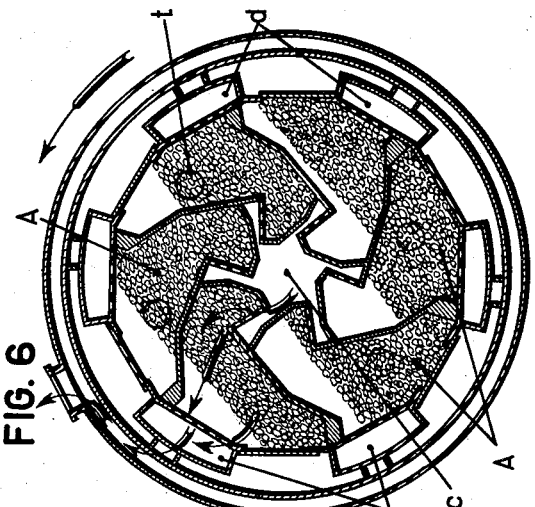
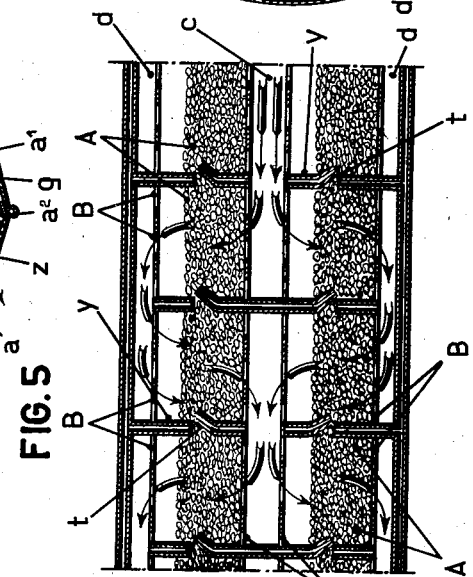
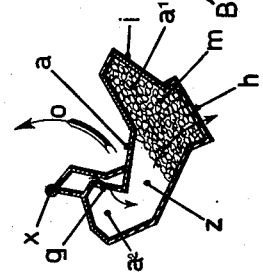
Inventor
C. A. Delemme
By C. F. Wenderoth
Atty Patented Mar. 26, 1935

1,995,966

UNITED STATES PATENT OFFICE 1,995,966

APPARATUS FOR THE CONDITIONING OF SUBSTANCES

Cyrille Arthur Delemme, Paris, France

Application May 25, 1932, Serial No. 613,573
In France June 4, 1931

8 Claims. (Cl. 34—5)

The present invention relates to apparatus for subjecting substances to the action of fluids. The type of apparatus with which the invention is concerned is that in which the substance to be treated is contained in one or more compartments or cells which are arranged so as to be rotated. The compartments or cells are moreover independent of each other, that is to say, the substance undergoing treatment is not passed from one cell to another but always remains in the same cell and each cell is provided with a single inlet and a single outlet for the treating fluid through which the substance undergoing treatment cannot pass. The invention is not concerned however, with apparatus in which the substance to be treated is circulated from compartment to compartment round the center of rotation during the rotation.

This apparatus may be used for a variety of purposes such as drying, humidifying, conditioning and washing granular, powdered or like materials. It may also be used for such purposes as the extraction of juices from substances such as beet pulp or the extraction of substances from mixtures or compounds by means of solvents or chemical reagents. The apparatus is, in fact, suitable for all purposes where a granular, powdered or like broken or disintegrated substance is to be subjected to the treating action of a liquid or a gas.

Apparatus for these purposes is well known, but in most cases it is usual for the treating fluid to be introduced therein so that it only superficially licks the substance undergoing treatment. This fluid naturally tends to pass from the inlet port to the exhaust port along the easiest and least obstructed path and the major part of it thus fails to traverse the mass of the substance contained in the cell. The result is that the fluid does not come into intimate contact with the various particles of the substance undergoing treatment and that the efficiency of the apparatus leaves a lot to be desired.

This difficulty can be alleviated to some extent by filling the compartments or cells to a greater extent but then, the movement of the material is so restricted that only a portion of the material is acted upon by the treating fluid. Drums made up of compartments containing baffles to prevent the treating fluid from passing directly from the inlet to the outlet without passing through the substance to be treated have also been proposed but again, it is difficult to ensure in this way that the treating fluid will act at all uniformly on all portions of the substance.

In particular, a drying machine for grain and other granular substances has been proposed consisting of a cylindrical shell mounted about a hollow shaft and divided by a diametrically arranged partition into two compartments for containing the grain to be dried.

By means of the present invention, an apparatus of the type set forth can be constructed which overcomes the above-mentioned disadvantages.

According to the present invention, the novel apparatus comprises one or more cells arranged so as to be rotated about a common axis and each made up of two pockets off-set from the ends of a connecting passage. Each cell has one inlet for the treating fluid which is provided in one of the pockets and one outlet which is provided in the other pocket and the relative sizes of the pockets and of their connecting passage are made such that when a cell is filled to not more than about half its total capacity, the treating fluid in passing from its inlet to its outlet is constrained to pass through the substance in the cell in all angular positions of the cell. In the preferred construction, the pockets and their connecting passage are so proportioned that when the drum is rotated, the whole of the substance in a cell is progressively projected into the passage so that every part of it is thus progressively subjected to the treating action of the fluid.

Axially adjacent cells of a rotating drum may be made to communicate with one another through ports provided in their common walls so that the substance may pass from one cell to another during the course of the treatment.

The common wall between adjacent cells may also be made hollow, an arrangement which is particularly advantageous in cases where the fluid is used hot, for example where hot air is used as a drying medium. The space provided between the two walls of the partition common to two cells and which receives the fluid may be used to contribute to the heating or to the cooling of these walls.

In order that the invention may be easily understood and be more readily carried into effect, some examples of construction in accordance therewith will now be described with reference to the accompanying drawing, in which:—

Figure 1 shows in perspective an apparatus for treating substances according to the invention, Figure 2 is a transverse section through the drum of the apparatus but is shown in a different angular position from that shown in Figure 1, Figure 3 is a diagram indicating the circulation of the fluid in the various cells of an apparatus in accordance with the invention and in the fluid inlet and exhaust pipe-lines, Figure 4 is a diagrammatic transverse section of one cell of a modified form of drum, Figure 5 is a diagram showing the circulation of the fluid in another form of the invention, Figure 6 is a view similar to Figure 2 of the modification shown in Figure 5.

In the example shown in Figures 1 and 2, the apparatus consists of a drum $b$ comprising six cells $a$ and a common central duct $c$ for the admission of the fluid. Each cell $a$ of the drum $b$ is provided, round its circumference, with a port $f$ covered by a sieve $h$ and in communication with the surrounding atmosphere and serving as an outlet for the treating fluid. Each cell $a$ of the apparatus is provided with a door $i$ which may be used both for feeding and for emptying the apparatus.

Each cell $a$ also has a port $e$ which serves as an inlet for the treating fluid which is supplied through a common duct $c$ directly connected with all the central ports $e$ of the individual cells. The central ports $e$ of the cells are covered by sieves $g$ similar to the sieves $h$ of the peripheral ports $f$.

The substance to be treated is indicated at $m$ and its angle of repose, in the example shown, is approximately 60°, while each cell is filled to about 55 per cent. of its total capacity. While functioning, the drum $b$ rotates constantly about the axis $x$ in the direction of the arrow $o$.

As is seen in Figure 2, the cells $a$ which make up the drum $b$ are themselves made up of two pockets $a^1$ and $a^2$ joined by portions of restricted cross-section or passages $z$.

The drum shown in Figures 1 and 2 may be enclosed in an outer drum.

Figure 3 is a diagrammatic section showing the circulation of the fluid through the cells and the ducts of an apparatus according to Figures 1 and 2 in which there is such an outer drum providing a peripheral space for the circulation of the fluid. The essential parts of the drum are shown in this figure with the reference letters used in Figures 1 and 2. The arrows drawn in full lines show the direction of flow of the fluid when this is caused to flow from the center of the drum towards the periphery. Thus, the fluid passing through the common duct $c$ enters the cells $a$ through the ports $e$ and after traversing the material to be treated flows out through the ports $f$. All the ports $f$ communicate with a duct $d$ through which the fluid is evacuated. By the provision of a four-way cock $p$, having a port $q$ connected to the fluid inlet piping and a port $r$ connected to the piping through which the fluid is exhausted, the direction of flow can be reversed and the fluid caused to take the path indicated by the arrows shown in dotted lines.

Figure 4 is a transverse section of a single cell $a$, having an axis of rotation $x$. This single cell may itself constitute the drum or it may have other cells arranged adjacent to it about the axis of rotation so as to form a drum such as is shown in Figures 1 and 2. The cell can be rotated in the direction of the arrow $o$ and the fluid be made to pass through the substance $m$ as shown by the arrows within the cell.

No special arrangement is shown in the drawing for rotating the cell in this manner nor for circulating the fluid through it but suitable arrangement for this purpose will readily occur to those skilled in the art. For example, the driving shaft $x$ might be made hollow and have one or more ports opening into the cell for the introduction of the treating fluid.

The relative sizes of the pockets $a^1$ and $a^2$ and the passage $z$ between them are made such that when a cell is about half full, there is never a free passage for the treating fluid from inlet to outlet. With a cell of the general shape indicated in Figures 2 and 3, at all times, either the fluid inlet or the fluid outlet is covered by the material in all angular positions of the drum and moreover every part of the material is, during rotation of the drum, progressively projected into the path of the treating fluid. That this is so is clearly seen from Figure 2 which shows the disposition of the material in a cell in six different angular positions.

As already explained, the treating fluid may pass from the center of rotation to the periphery or vice versa, means such as the four-way cock $p$ shown in Figure 3 being provided for this purpose. This provision is very useful because then, should the sieves covering the outlet ports become clogged up for any reason, the direction of the fluid can be reversed and the clogged sieves automatically cleaned.

In the forms of construction which have been described, the object of the portions of restricted cross-section or passages $z$ joining two pockets is to guide the substance undergoing treatment in such a manner that it constantly presents itself in front of the fluid during its travel from the inlet port in one pocket towards the outlet port in the other pocket so that the fluid must inevitably percolate through the mass of the substance all the portions of which, in succession, come into intimate contact with the fluid admitted into the cells. As the distribution of the fluid throughout all the cells is uniform, a regular and homogeneous treatment of the charge in all the cells of the drum is obtained.

The form of construction shown in Figures 5 and 6 is very similar to that shown in Figures 1 and 2. It differs, however, in the two following particulars.

Each cell is subdivided along the axis of rotation by partitions $y$ which may be hollow and into which the fluid with which it is desired to treat the substance can be introduced so as to form a jacket of fluid for the subdivisions of the cells. This arrangement is particularly advantageous where the fluid is used hot, for example where hot air is used for drying purposes. The double walls may act as a heating or as a cooling device.

It will be seen from Figure 6 that the cells A are assembled round the common duct $c$ and that the subdivisions of each cell are in communication with each other through ports $t$ in the partitions $y$ between them. Alternate partitions $y$ extend across the duct $c$ but leave a peripheral space $d$ through which the fluid can pass from one subdivision to the next. As each sub-division is in communication through ports B with both the duct $c$ and the spaces $d$, the fluid is constrained to follow a tortuous path from one sub-division to the next as indicated by the arrows in Figure 6. The fluid is thus compelled to pass several times through the substance undergoing treatment while the substance travels from one subdivision into another through the ports provided in the common partition walls $y$. This apparatus therefore provides for continuous treatment of the substance as distinct from the batch treatment described in connection with Figures 1 and 2.

The apparatus in accordance with the invention can be used for a large variety of purposes, but it has been found particularly useful as a rotary drying apparatus. It has in fact been found particularly useful for drying grains such as of rice, coffee, cocoa and manioc by means of hot air.

What I claim is:

1. An apparatus for the conditioning of substances comprising a rotating drum, a plurality of cells in the said drum, an inlet and an outlet port in each of said cells, a feed conduit common to said inlet ports, a discharge conduit common to said outlet ports and each of said cells having a constricted passage between said inlet and outlet ports.

2. An apparatus for the conditioning of substances comprising a rotating drum, a plurality of cells assuming the form of a prism in the said drum, an inlet and an outlet port in each of said cells, a feed conduit common to said inlet ports, a discharge conduit common to said outlet ports and each of said cells having a constricted passage between said inlet and outlet ports.

3. In an apparatus for the conditioning of substances as claimed in 2 in which each cell is of prismatic shape and having a straight section and the straight section of the prismatic cell comprises a plurality of narrower portions.

4. An apparatus for the conditioning of substances as claimed in 1 in which the narrowing of the cell is obtained by bringing closer together the walls of the cells.

5. An apparatus for the conditioning of substances as claimed in 1 in which the narrowing of the cell is obtained by baffles positioned inside the cells.

6. An apparatus for the conditioning of substances as claimed in 1 in which sieves are provided covering the inlet and outlet ports of the cells.

7. An apparatus for the conditioning of substances as claimed in 1 in which the cells of the rotating drum have common walls and intercommunicate by means of ports provided through the common walls in order to permit the substance to travel from one compartment to another during the course of the treatment.

8. An apparatus for the conditioning of substances as claimed in 1 in which the cells have common walls and the common wall of two adjoining cells is constituted by a double wall.

CYRILLE ARTHUR DELEMME.